(No Model.)
A. A. ANDERSON.
EGG HOLDER.
No. 499,081. Patented June 6, 1893.
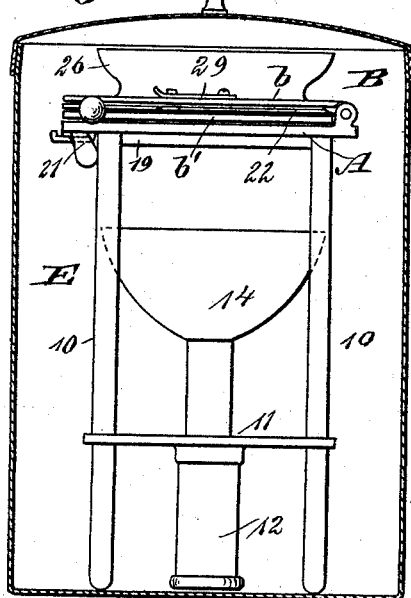
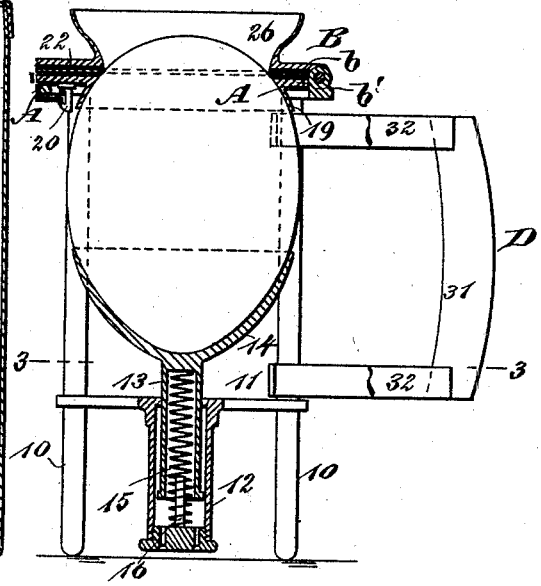
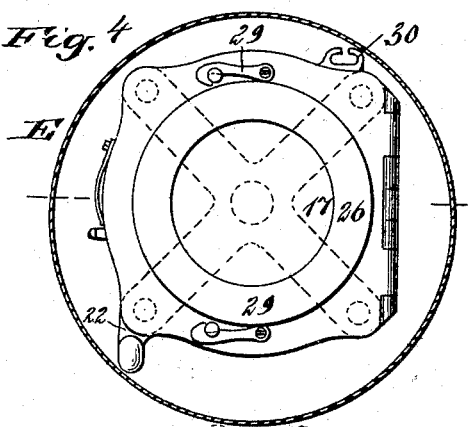
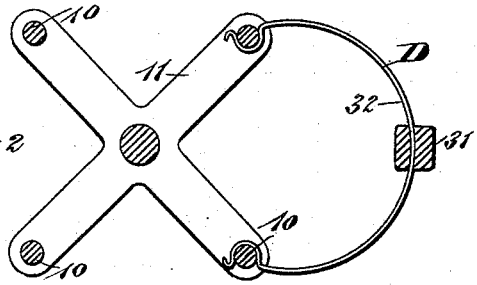
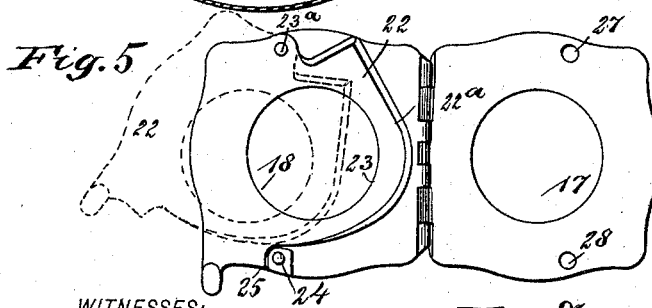
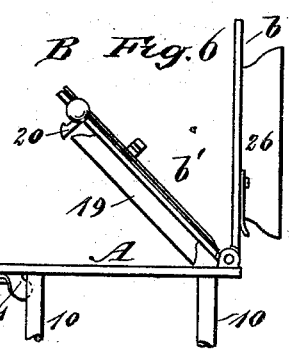
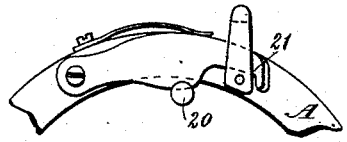
WITNESSES:
J. A. Bergstrom
C. Sedgwick
INVENTOR
A. A. Anderson
BY
Munn & Co.
ATTORNEYS.

UNITED STATES PATENT OFFICE.

ABRAHAM A. ANDERSON, OF NEW YORK, N. Y.

EGG-HOLDER.

SPECIFICATION forming part of Letters Patent No. 499,081, dated June 6, 1893.

Application filed September 12, 1892. Serial No. 445,630. (No model.)

*To all whom it may concern:*

Be it known that I, ABRAHAM ARCHIBALD ANDERSON, of New York city, in the county and State of New York, have invented a new and useful Improvement in Egg-Holders, of which the following is a full, clear, and exact description.

My invention relates to an improvement in egg holders, and has for its object to construct a holder in such manner as to retain an egg firmly in a vertical position and at the same time permit of cutting the shell easily and neatly, the contents of the shell at the time it is cut being prevented from running over or spilling in any manner. A further advantage of this holder consists in the fact that if it is found after the egg has been opened that it is not sufficiently cooked it may be conveniently re-cooked, or a raw egg may be placed in the holder and the egg may then be introduced, together with the holder, into the water for cooking. The holder affords every facility for stirring the material within the egg shell during the process of cooking or afterward, and butter, condiments, &c., may be conveniently added to the material of the egg while in the shell.

A further object of the invention is to provide a device through the medium of which any one may cook an egg at the table, for example, using an alcohol lamp or other convenient means for heating the water, the latter being placed in a dish into which the holder may be conveniently placed.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the holder illustrating it as placed in a vessel, the vessel being in vertical section. Fig. 2 is a central vertical section through the holder, the section being taken practically on the line 2—2 of Fig. 4. Fig. 3 is a horizontal section taken on the line 3—3 of Fig. 2. Fig. 4 is a plan view of the holder located in a vessel, the vessel being in horizontal section. Fig. 5 is a plan view of the holder, one section of the top being thrown open to expose the knife. Fig. 6 is a side elevation of the upper portion of the holder, the three sections comprising the upper portion being shown separated; and Fig. 7 is a bottom plan view of a portion of the lower section of the top, illustrating the construction of the latch employed.

The body portion of the device consists of a ring-like cap A, which is supported in a horizontal position by legs 10, and the legs near their lower ends are usually connected by a spider 11, from the central portion of which spider a socket 12, is pendent. Into this socket the shank 13 of a cup 14, is introduced, the cup being of such size that it may be moved readily between the legs 10, as shown in Fig. 2. The shank of the cup is cushioned by a spring 15, the cushion being produced in any suitable or approved manner. Usually, however, the shank is made hollow, and the spring is introduced within the chamber thereby formed, and the upper end of the spring has bearing against the upper wall of the chamber, while the lower end of the spring is carried around a guide pin 16, and has bearing upon the bottom of the socket 12, at which point the pin is secured. The spring 15, normally holds the cup at a point between the spider 11 and the cap ring A. The cap ring supports what may be termed a head B, and this head is made in two sections, an outer section $b$ and an inner section $b'$. Both of the sections are hinged at the same side upon the cap ring A. The intermediate section is adapted to close down closely upon the cap ring. Each of the sections of the head is provided with a central opening therein, the openings being designated respectively as 17 and 18. From the under margin of the opening in the inner head section $b'$, a collar 19, is downwardly projected, the inner face of which collar is flared outward so as to give it a dished appearance; and a locking engagement is effected between the intermediate section $b'$ and the cap ring by means of a keeper 20 upon the former engaging with a spring-controlled latch 21 upon the bottom portion of the cap ring, the latch being shown in detail in Fig. 7; but I desire it to be distinctly understood that any approved form of locking device may be employed instead of the keeper and the latch above referred to. The intermediate section of the head carries a knife 22; this knife is somewhat of circular shape, its inner edge 22ª being the cutting edge, and the knife is provided with a central opening 23, which corresponds in size to and registers with the opening 18 in the intermediate section when the knife is carried inward thereon. The pivot point of the knife is at one side, as illustrated at 23ª in Fig. 5, and its outward movement is illustrated in the same figure by dotted lines. The pivot point of the knife extends upward beyond its upper face, and is provided with a slot as shown in dotted lines in Fig. 4, in order that it may constitute a keeper, as will be hereinafter described; and a corresponding keeper 24, is oppositely located upon the upper face of the intermediate section of the head; this keeper is provided with a shoulder 25, which limits the inward movement of the knife.

The top or cover section of the head b, has the opening 17, therein surrounded by a flange 26, which flange is preferably outwardly flared, but the flange may be omitted if in practice it is found desirable. Ordinarily, however, in this section of the head, the flange is retained, as it adds to the beauty of the head and also prevents the contents of the shell when lifted from it by a spoon from being readily spilled, and the flange further acts as a guide for the spoon.

The cover section of the head is provided at opposite sides with apertures designated respectively as 27 and 28; and when the cover section of the head is carried down upon the intermediate section, or more properly over the knife upon the intermediate section, the keepers of the latter section, 23ª and 24, enter the apertures 27 and 28, and the said keepers are thereupon engaged by latches 29, located upon the outer surface of the cover section of the head, as is best shown in Fig. 4.

When the sections of the head are in locking engagement with each other and with the cap ring the knife may be freely moved in and out therefrom, as the hinge is so constructed as to leave a suitable space between the two head sections, in which the knife may have play.

Preferably at one side of the cap ring a bracket 30 is located, in which may be hung an egg spoon.

In operation one end of an egg is inserted in the cup 14 after the latter has been pressed downward to its lowest point, or a sufficient distance to admit of the introduction of the egg, and the cup is thereupon released so that the opposite end of the egg is firmly held against the inner face of the collar 19 forming a portion of the intermediate head section. If the egg is cooked prior to its introduction in the cup the knife is drawn outward, and when the egg is held between the cup and the head the knife upon being carried inward will sever the upper section of the egg, and that section may then be readily removed and the contents of the shell seasoned and eaten in the usual manner, as the knife will have passed entirely out of the way, the margin of its opening surrounding the shell. If it is found that the egg has not been properly cooked it may be sufficiently cooked by placing the stand or holder with the egg in place therein in a suitable vessel containing a proper amount of water; or, the egg when uncooked may be placed in position within the holder and introduced into a properly heated vessel of water and cooked, but to cut the end from the egg when cooked the sections of the head are drawn back to enable the knife to be brought outward; or, if in practice it is found desirable the inner edge of the knife as well as its outer edge 22ª may be made a cutting edge.

To facilitate the removal of the stand from place to place when hot, a handle D of any approved construction may be employed. One form of this handle is shown in the drawings and it consists of an upright section 31, supporting two or more horizontally located and curved spring arms 32, the arms terminating at their ends in sockets, which sockets may be made to engage with two opposing legs of the stand by springing the arms inward, as shown in both Figs. 2 and 3.

As the head of the device is constructed in sections, and further as the sections are readily separable, it is evident that the device may be kept clean with but little trouble; and it is also evident that the device may be inserted in a receptacle capable of holding water and of being placed over a spirit lamp, or like heating agent, thus enabling a person to prepare an egg at the table, such a receptacle being shown in Figs. 1 and 4 and designated as E.

Having thus described my invention, I claim as new and desire to secure by Letters Patent—

1. The combination with the frame having a cup or socket to support the egg, of an apertured head receiving the upper end of the egg, and a knife pivoted on the head and comprising a plate having a circular aperture registering with that of the head and having its outer marginal edge formed into a cutting edge, substantially as set forth.

2. An egg holder, comprising a frame, the cup or socket, a head mounted on the upper end of the frame and formed of two hinged sections and an outwardly swinging intermediate knife-forming plate having its outer marginal edge formed as a cutting edge, the head sections and the knife plate having registering circular egg receiving openings, and means for securing the head sections together and to the holder, substantially as set forth.

3. An egg holder, comprising a frame, the cup or socket, a head hinged to the upper end of the frame and formed of two centrally apertured sections having oppositely flared flanges 19, 26 respectively, and the intermediate outwardly swinging plate having a central circular aperture registering with those of the two head sections and having its inner marginal edge formed as a cutting edge, substantially as set forth.

4. An egg holder, comprising a frame, a cup or socket, a hinged head formed of two sections hinged together and provided with registering egg receiving apertures, an intermediate knife forming plate having a circular egg receiving aperture registering with those of the head sections and having its pivot extending up through an aperture in the upper head section, a pin on the lower head section opposite said pivot and extending up through an aperture in the upper head section, latches 29 on the upper head section and engaging the said pivot and pin, and a latch to secure the head as a whole to the frame, substantially as set forth.

5. The combination with an egg holder, the frame of which is provided with vertical rods, of the vertical handle bar 31 provided at its ends with parallel horizontally extending bowed spring arms 32, the ends of each bowed arm being curved inwardly and then outwardly forming oppositely opening sockets receiving the said rods; whereby the handle may be removed by pressing the ends of each spring arm toward each other, substantially as set forth.

6. An egg holder, comprising the vertical rods 10, spider 11, provided with depending socket 12, cup 14 having a spring cushion shank entering said socket, top ring A, on the upper ends of the rods, vertically swinging head B, formed of two centrally apertured hinged sections b b' having oppositely flared flanges 26, 19 respectively and the intermediate apertured knife plate pivoted to swing outwardly across the said flanged openings, substantially as set forth.

ABRAHAM A. ANDERSON.

Witnesses:
E. M. CLARK,
F. W. HANAFORD.